UNITED STATES PATENT OFFICE.

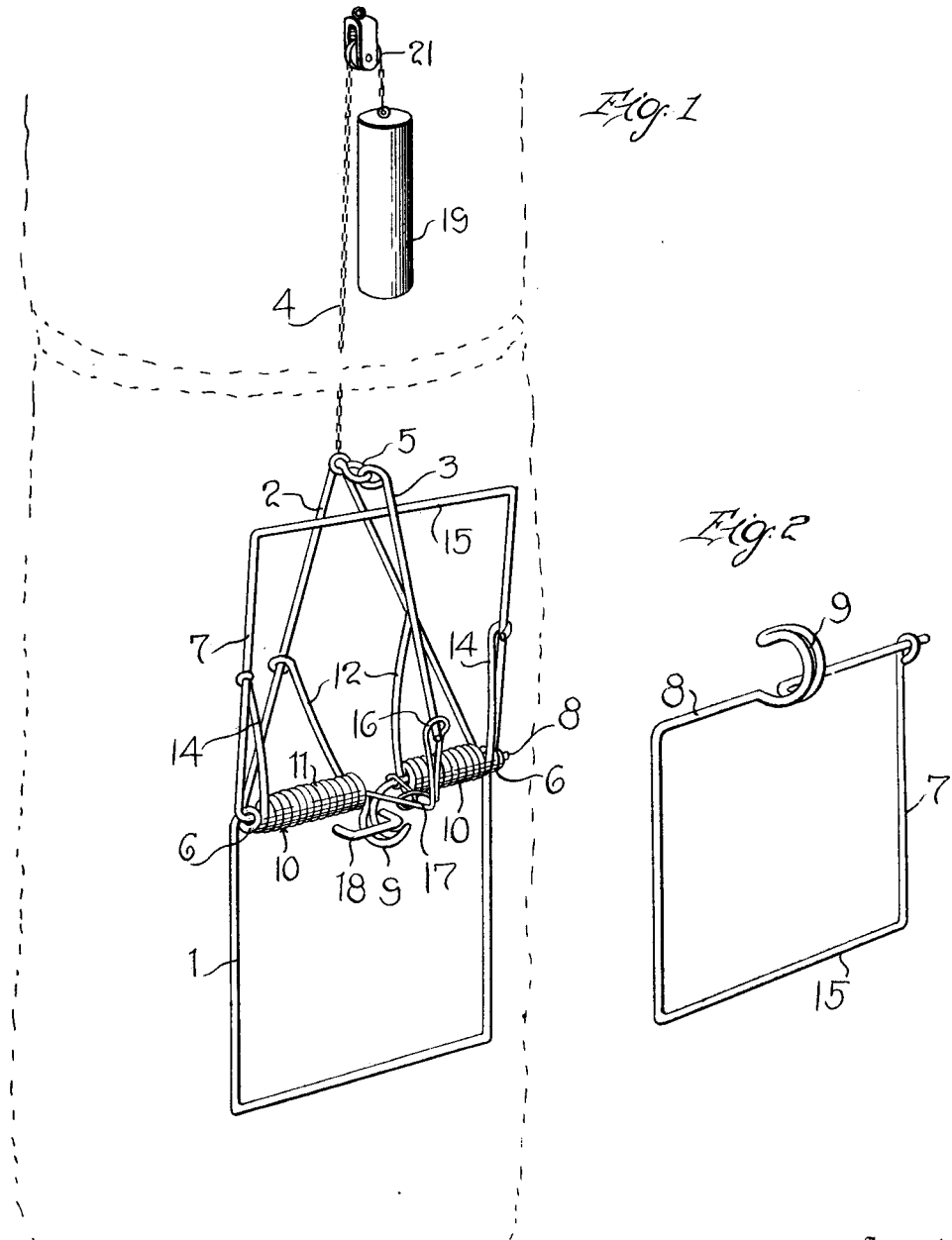

MYRON EUGENE HORR AND ROSWELL GUY HORR, OF ARDLEY, BRITISH COLUMBIA, CANADA.

TRAP.

1,119,962. Specification of Letters Patent. Patented Dec. 8, 1914.

Application filed January 26, 1914. Serial No. 814,465.

*To all whom it may concern:*

Be it known that we, MYRON EUGENE HORR and ROSWELL GUY HORR, citizen of the United States of America and subject of the King of England, respectively, residing at Ardley P. O., in the Province of British Columbia and Dominion of Canada, have invented certain new and useful Improvements in Traps, of which the following is a specification, reference being had to the accompanying drawings.

This invention relates to certain improvements in traps and has relation more particularly to a device of this general character wherein coacting jaws are employed; and the object of the invention is to provide a device of this general character which is adapted to be supported free of the ground and which is adapted to be automatically elevated upon the trapping action of the jaws whereby the victim is protected against prowling animals.

The invention consists in the details of construction and in the combination and arrangement of the several parts of our improved trap, whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is a view in perspective of a trap constructed in accordance with an embodiment of our invention, the support to which it is illustrated as applied being shown in dotted lines; and Fig. 2 is a fragmentary view in perspective, detached, of the movable jaw herein included.

As disclosed in the accompanying drawings, 1 denotes the stationary jaw of the trap provided with the extension 2, to which is adapted to be suitably secured the trigger 3 and an extremity of a flexible member 4, forming part of a hoisting mechanism to be hereinafter more particularly referred to. We find it of advantage to produce the jaw 1 and its extension 2 of a single strand of wire of requisite gage and to have the extension 2 substantially triangular in form with its apex portion 5 bent forwardly at substantially right angles to afford a loop whereby free pivotal or hinge engagement may be had with the trigger 3, hereinbefore referred to.

The side strands of the jaw 1, at the junction of the extension 2 therewith, are coiled to afford the alined eyelets 6 adapted to serve as a fulcrum for the movable jaw 7, such jaw being disclosed herein as also produced of wire of requisite gage and having its rear section 8 suitably directed through the eyes 6 in a manner which is believed to be self-evident. The intermediate portion of the section 8 is so bent as to afford the upwardly disposed rearwardly directed (when the jaws are in overlapped relation) hook member 9, for a purpose which will hereinafter be more fully set forth.

Coacting with the jaws 1 and 7, are the tension members 10 which are adapted to impart such force to the movable jaw 7, when released from distended relation with the jaw 1, as to result in a blow or impact sufficient to kill the animal which may cause the release of the movable jaw 7 from distended position. As herein disclosed, each of the tension members 10 comprises a coiled body 11 disposed around the section 8 of the jaw 7 and positioned between the hook member 9 and an eye 6, the extremities 12 and 14 of such body being secured, respectively, to corresponding sides of the extension 2 and movable jaw 7 and thereby resulting in a function which is believed to be self-evident.

When the movable jaw 7 is adjusted in proper distended position, the trigger 3 is directed over the forward section 15 of such jaw 7 and the extremity of such trigger is engaged within the loop 16 formed in the outer extremity of the latch member 17, such latch member being loosely pivoted to the rear section 8 of the movable jaw 7 at opposite sides of the hook member 9 and is provided intermediate its length with an eye or loop 17 to afford a means whereby the requisite bait may be properly applied with convenience and facility.

In the practical operation of our invention, it is intended that the trap will be supported at a point above the ground so that it will be necessary for the victim to reach up for the bait, whereby it will be seen that the necessity of a barricade is entirely obviated and that a proper "set" may be made with greater ease. The hook member 9 is adapted to maintain the trap in its elevated or suspended position and is adapted to coact with a staple-like member 18 suitably embedded in a tree or other place and its form is such as to cause it to automatically enter into locking engagement with such staple-like member 18 when the movable jaw 7 is adjusted in distended position and serves to hold the trap against upward movement under the influence of the weighted mass 19 also comprised within the hoisting mechanism, such weighted mass being secured to the opposite extremity of the flexible member 4, such flexible member being directed around a desired sheave or pulley 21 suitably supported at a point above the position of the staple-like member 18. The weight of the mass 19 is such as to be in excess of the weight of the animal for which the trap is set plus the weight of the trap proper and its concomitant parts as it will be perceived that when the victim springs the trap the resultant movement of the jaw 7 will automatically release the trap from engagement with the staple-like member 18, whereby the weighted mass 19 will lift or hoist the same a predetermined distance whereby the victim, or more particularly its pelt, will be beyond reach of prowling animals.

From the foregoing description, it is thought to be obvious that a trap constructed in accordance with an embodiment of our invention is of an extremely simple and comparatively inexpensive nature and is particularly well adapted for use by reason of the convenience and facility with which it may be set and released and by reason of the arrangement whereby the victim is elevated after capture and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. In combination with an anchoring means, of a trap comprising relatively movable jaws, one of such jaws being provided with means movable therewith when released and adapted to engage the anchoring means when the jaws are in distended relation, releasable means for maintaining the jaws in distended relation, and an elevating means operatively connected with the trap.

2. The combination with suitable anchoring means, of a trap comprising relatively movable jaws, one of such jaws being provided with a hook member engageable with the anchoring means when the jaws are in distended position, releasable means for holding the jaws in distended position, and an elevating means operatively connected with the trap.

3. The combination with suitable anchoring means, of a trap comprising relatively movable jaws, one of said jaws being provided with an extension, elevating means operatively connected with said extension, the second of said jaws being provided with a hook member engageable with the anchoring means when the jaws are in distended position, and releasable means for holding the jaws in distended position.

4. The combination with suitable anchoring means, of a trap comprising two pivotally connected jaws, one of said jaws being provided with a hook member at its pivotally engaged extremity engageable with the anchoring means when the jaws are in distended position, releasable means for holding the jaws in distended position, and an elevating means operatively connected with the trap.

In testimony whereof we hereunto affix our signatures in the presence of two witnesses.

MYRON EUGENE HORR.
ROSWELL GUY HORR.

Witnesses:
M. S. CARTAN,
M. L. RANEY.

Copies of this patent may be obtained for five cents each, by addressing the "Commissioner of Patents, Washington, D. C."